US012770291B2

(12) United States Patent
Spichtinger et al.

(10) Patent No.: US 12,770,291 B2
(45) Date of Patent: Oct. 20, 2026

(54) ON-ORBIT GEOREFERENCING

(71) Applicant: OroraTech GmbH, Munich (DE)

(72) Inventors: Andrea Spichtinger, Munich (DE); Valentin Dornauer, Munich (DE); Fabian Schöttl, Munich (DE); Michael Schmitt, Neubiberg (DE); Mojgan Madadikhaljan, Neubiberg (DE)

(73) Assignee: OroraTech GmbH, Munich (DE)

( * ) Notice: Subject to any disclaimer, the term of this patent is extended or adjusted under 35 U.S.C. 154(b) by 0 days.

(21) Appl. No.: 19/041,342

(22) Filed: Jan. 30, 2025

(65) Prior Publication Data

US 2025/0252596 A1 Aug. 7, 2025

(30) Foreign Application Priority Data

Feb. 2, 2024 (LU) ........................................ 506290

(51) Int. Cl.
*G06T 7/73* (2017.01)
*B64G 1/10* (2006.01)
*G06V 10/22* (2022.01)

(52) U.S. Cl.
CPC .............. *G06T 7/74* (2017.01); *B64G 1/1028* (2023.08); *G06V 10/225* (2022.01); *G06T 2207/10048* (2013.01); *G06T 2207/30181* (2013.01)

(58) Field of Classification Search
None
See application file for complete search history.

(56) References Cited

U.S. PATENT DOCUMENTS 8,582,818 B2 * 11/2013 Hammarstrom ..... G06V 10/255 382/104
9,361,539 B2 * 6/2016 Li ........................ G06V 10/457
(Continued)

OTHER PUBLICATIONS

Extended European Search Report, dated Mar. 14, 2025, for European Application No. 25154869.9 - 1207, 9 pages.
(Continued)

*Primary Examiner* — Talha M Nawaz
(74) *Attorney, Agent, or Firm* — Seed Intellectual Property Law Group LLP

(57) ABSTRACT

A method of satellite-based georeferencing for IR images of Earth surface captured by a satellite-mounted IR imaging device pointing towards Earth includes capturing an IR image of Earth surface using the IR imaging device; determining an estimated pointing direction of the IR imaging device at the time of capturing the IR image, based on an on-board attitude determination system of the satellite; determining an estimated area of Earth surface that is covered by the captured IR image, based on the estimated pointing direction; obtaining a set of image features in one or more pre-stored images of areas of Earth surface that at least partially overlap with the estimated area of Earth surface, wherein the pre-stored images are associated with known position coordinates; performing matching of the set of image features against the captured IR image to identify matching features; and determining an actual area of Earth surface that is covered by the captured IR image or an actual pointing direction of the IR imaging device at the time of capturing the IR image based on the identified matching features. The application further relates to corresponding apparatus, satellites, programs, and computer-readable storage media.

20 Claims, 2 Drawing Sheets

(56) References Cited

U.S. PATENT DOCUMENTS 11,200,683 B2 * 12/2021 Moriya .................. G06V 20/30
2023/0056849 A1 * 2/2023 Gulde ................ G01C 21/3852

OTHER PUBLICATIONS

Hamidi et al., "Precise 3D Geo-Location of UAV Images Using Geo-Referenced Data," International Conference on Sensors & Models in Remote Sensing & Photogrammetry, The International Archives of the Photogrammetry, Remote Sensing and Spatial Information Sciences, vol. XL-1/W5, Nov. 23, 2015, pp. 269-275.
Luxembourg Search Report and Written Opinion, mailed Jul. 12, 2024, for Luxembourg Patent Application No. LU506290, 9 pages.
Madadikhaljan et al., "Georeferencing Thermal Satellite Images Based on Land Cover Information Extraction," IGARSS 2023-2023 IEEE International Geoscience and Remote Sensing Symposium, Pasadena, California, USA, Jul. 16-21, 2023, pp. 6362-6365.

* cited by examiner

ON-ORBIT GEOREFERENCING

BACKGROUND

Technical Field

This disclosure generally relates to satellite-based georeferencing for infrared (IR) images of Earth surface captured by a satellite-mounted IR imaging device pointing towards Earth. In particular, the disclosure relates to techniques that use matching of image features against captured IR images.

Description of the Related Art

When taking images of Earth with a satellite-mounted imaging device, it is desirable to have more or less accurate knowledge of the actually covered geographical area. One option for inferring the actually covered geographical area is to estimate the pointing direction of the satellite (or rather, of the satellite-mounted imaging device) using the satellite's attitude determination and control system (ADCS), assuming a known position of the satellite relative to Earth. However, cost-effective ADCSs for (smaller) satellites typically have an uncertainty of pointing direction of the satellite of ≈0,1° (@3σ). When taking images of Earth with the satellite-mounted imaging device, this may lead to significant uncertainties of the actually covered areas on Earth surface. For example, for a satellite orbit height of 400 to 500 kilometers, the aforementioned uncertainty of pointing direction would translate to a location uncertainty on ground (on-ground error) of ≈2.5 km, especially for larger swaths and off-nadir angles.

On the other hand, some algorithms, such as image-based real-time fire detection or burnt area detection, rely on reasonably accurate knowledge of the actually covered area, and too large on-ground errors may render any determination results of such algorithms useless. The accuracy requirements of such algorithms typically are not met by ADCSs aboard smaller satellites, such as CubeSats.

Another approach for determining the geographical area actually covered by a satellite image is to perform georeferencing for the satellite image in on-ground computing centers with greater computational resources than the satellite, after wireless downlink to ground. This approach however suffers from transmission delays and is therefore not suitable for real-time processing, and may unduly strain the satellite's downlink capacity.

In addition, conventional techniques for on-ground georeferencing may not be applicable to IR images and may not be able to account for changes of Earth surface due to change of weather conditions and the diurnal and seasonal changes. Conventional techniques using visible light for georeferencing are not practical for IR nighttime images.

Another challenge are restricted upload capabilities, as many conventional techniques rely on images recently taken by other satellites.

Thus, there is a need for improved techniques for georeferencing for IR images of Earth surface captured by a satellite-mounted IR imaging device pointing towards Earth. There is particular need for such techniques that are applicable to small satellites, such as CubeSats, and that can operate in real time or at least near real time.

BRIEF SUMMARY

In view of some or all of these needs, the present disclosure proposes a method of satellite-based georeferencing for IR images of Earth surface captured by a satellite-mounted IR imaging device pointing towards Earth, as well as corresponding apparatus, satellites, computer programs, and computer-readable storage media, having the features of the respective independent claims.

An aspect of the disclosure relates to a method of satellite-based georeferencing for IR images of Earth surface captured by a satellite-mounted IR imaging device pointing towards Earth. The method may include capturing an IR image of Earth surface using the IR imaging device. Therein, the IR image may be an image with at least a contribution in an IR frequency band. The method may further include determining an estimated pointing direction of the IR imaging device at the time of capturing the IR image, based on an on-board attitude determination system of the satellite. The method may further relate to or involve determining an estimated location (e.g., relative to Earth) of the IR imaging device, together with the estimated pointing direction. The determination may be further based, in either case, on an on-board GNSS sensor/receiver (e.g., GPS sensor/receiver). The method may further include determining an estimated area of Earth surface that is covered by the captured IR image, based on the estimated pointing direction. This may be done by application of trigonometry or ray tracing, for example. The method may further include obtaining a set of image features (e.g., templates) in one or more pre-stored images (for example including, but not limited to, IR images) of areas of Earth surface that at least partially overlap with the estimated area of Earth surface. Here, the pre-stored images may be associated with known position coordinates (e.g., in relation to Earth). The method may further include performing matching of the set of image features (e.g., templates) against the captured IR image to identify matching features. Performing the matching may relate to applying a matching method or algorithm to the set of image features in relation to the captured IR image. The matching or matching method may relate to one of feature matching, template matching, or image registration, for example. Each matching method may be based on traditional algorithms, Machine Learning, or Deep Learning, for example. The method may yet further include determining an actual area of Earth surface that is covered by the captured IR image or an actual pointing direction of the IR imaging device at the time of capturing the IR image based on the identified matching features.

Configured as described above, the proposed method allows for direct and real-time determination of accurate position coordinates of images captured aboard the satellite. There is accordingly no need to transfer any data (e.g., IR image data) to ground, which allows to avoid delays from data transmission and ensures independence availability of a downlink connection of sufficient bandwidth. Real-time georeferencing aboard the satellite allows for derivation of meaningful information, from satellite imagery, such as locations of fires and/or burnt areas in real time, which may be advantageously downlinked in a bandwidth-saving format or used aboard the satellite for further processing. Moreover, since the proposed method relies on IR image features, it is applicable both during daytime and during nighttime, and is not (or not much) affected by changes due to different weather conditions and/or daytimes and/or seasons. For the same reason, the proposed method is globally applicable and therefore can be continuously applied regardless of orbit position of the satellite.

In some embodiments, the set of image features may be obtained from a database of features maintained aboard the satellite. Therein, each image feature may be associated with known position coordinates (e.g., relative to Earth). The position coordinates of an image feature may be derived for example from known position coordinates associated with a prestored IR image from which the image feature is obtained (e.g., derived or extracted) or to which it otherwise relates. Additionally, the image feature may be associated with additional information, such as season or daytime, for example.

In some embodiments, the image features in the set of image features may be pre-stored as image files, vector files or any other compressed or optimized form in a storage medium aboard the satellite. Additionally or alternatively, the pre-stored images may be prestored in a storage medium aboard the satellite. That is, both the pre-stored images and/or the image features may be pre-stored on the storage medium aboard the satellite in some implementations.

Local storage of the image features and/or pre-stored images may accelerate on-board georeferencing and reduce a burden of processing. Moreover, the proposed method can operate independently of input of external data.

In some embodiments, the method may further include preprocessing the captured IR image before template matching. For example, the method may include applying a cloud mask to the captured IR image before template matching. In this case, the template matching may be restricted to the unmasked portion of the captured IR image. Likewise, the method may apply a mask masking portions of the captured IR image that are found not suitable for georeferencing, for example due to local image distortion, etc.

Preprocessing the captured IR images may facilitate matching of the image features to the preprocessed captured IR images, thereby improving computational efficiency and accuracy of eventual processing results.

In some embodiments, the set of image features may include a plurality of types of image features. Then, different preprocessing may be applied to the captured IR image, depending on the types of image features. This may yield different preprocessed versions of the captured IR image. Further, the aforementioned matching may be performed for each type of image features and may involve matching image features of a given type against a correspondingly preprocessed version of the captured image.

By specifically adapting the preprocessing to different types of image features and matching to appropriately preprocessed version of the captured IR image, efficiency and accuracy of the procedure can be further improved.

In some embodiments, the image features in the set of image features may relate to any (surface) characteristics with an imprint in IR, or in other words, any features of earth surface that are discernible in IR. For example, in some embodiments, the image features in the set of image features may relate to one or more of coast lines, water bodies, ridges of natural elevation, underground rivers or currents, water stream characteristics over oceans, landcover characteristics. These different categories may be said to define different types of image features. The water bodies may relate to lakes, rivers, etc., for example.

In some embodiments, the satellite may be a small satellite, such as a CubeSat, for example. Further, the satellite may be in Earth orbit at 450 km to 550 km orbit altitude, for example.

In some embodiments, the image features in the set of image features may have a side length, on Earth surface, of 0.5 to 10 kilometers, for example. Further, the captured IR image may have a side length, on Earth surface, of 10 to 800 kilometers, for example.

In some embodiments, the method may further include correcting the estimated pointing direction as obtained from the on-board attitude determination system based on the identified matching features. The corrected pointing direction may be used as estimated pointing direction for IR images captured in the future. Additionally or alternatively, the corrected pointing direction may be used for calibration of the on-board attitude determination system. The method may further include correcting the estimated location of the satellite.

Real-time availability of position coordinates associated with IR images captured by the on-board IR imaging device allows for quick and efficient calibration of on-board sensors of the satellites, including its ADCS. Moreover, accurate position coordinates associated with an IR image may be used for extrapolation to estimated position coordinates of IR images captured a certain period of time after the IR image under consideration.

Another aspect of the disclosure relates to an apparatus comprising a processor and a memory that is coupled to the processor and stores instructions for execution by the processor. The processor may be adapted to perform any of the methods described herein.

Another aspect of the disclosure relates to a satellite comprising the apparatus according to the preceding aspect. The satellite may be a CubeSat, for example.

Another aspect of the disclosure relates to a program including instructions that, when the program is carried out by a computing device, cause the computing device to perform any of the methods described herein.

Another aspect of the disclosure relates to a computer-readable storage medium storing the aforementioned program.

It should be noted that the methods and devices including the preferred embodiments as outlined in the present patent application may be used stand-alone or in combination with the other methods and devices disclosed in this document. Furthermore, all aspects of the methods and devices outlined in the present patent disclosure may be arbitrarily combined. In particular, the features of the claims may be combined with one another in an arbitrary manner.

It will be appreciated that device features and method steps may be interchanged in many ways. In particular, the details of the disclosed method of satellite-based georeferencing can be realized by the corresponding device/apparatus, and vice versa, as the skilled person will appreciate. Moreover, any of the above statements made with respect to the method (and, e.g., method steps) are understood to likewise apply to the corresponding device/apparatus (and, e.g., its processors, blocks, units, or stages), and vice versa.

BRIEF DESCRIPTION OF THE SEVERAL VIEWS OF THE DRAWINGS

Example embodiments of the disclosure are explained below with reference to the accompanying drawings, wherein.

DETAILED DESCRIPTION

Figure 1:
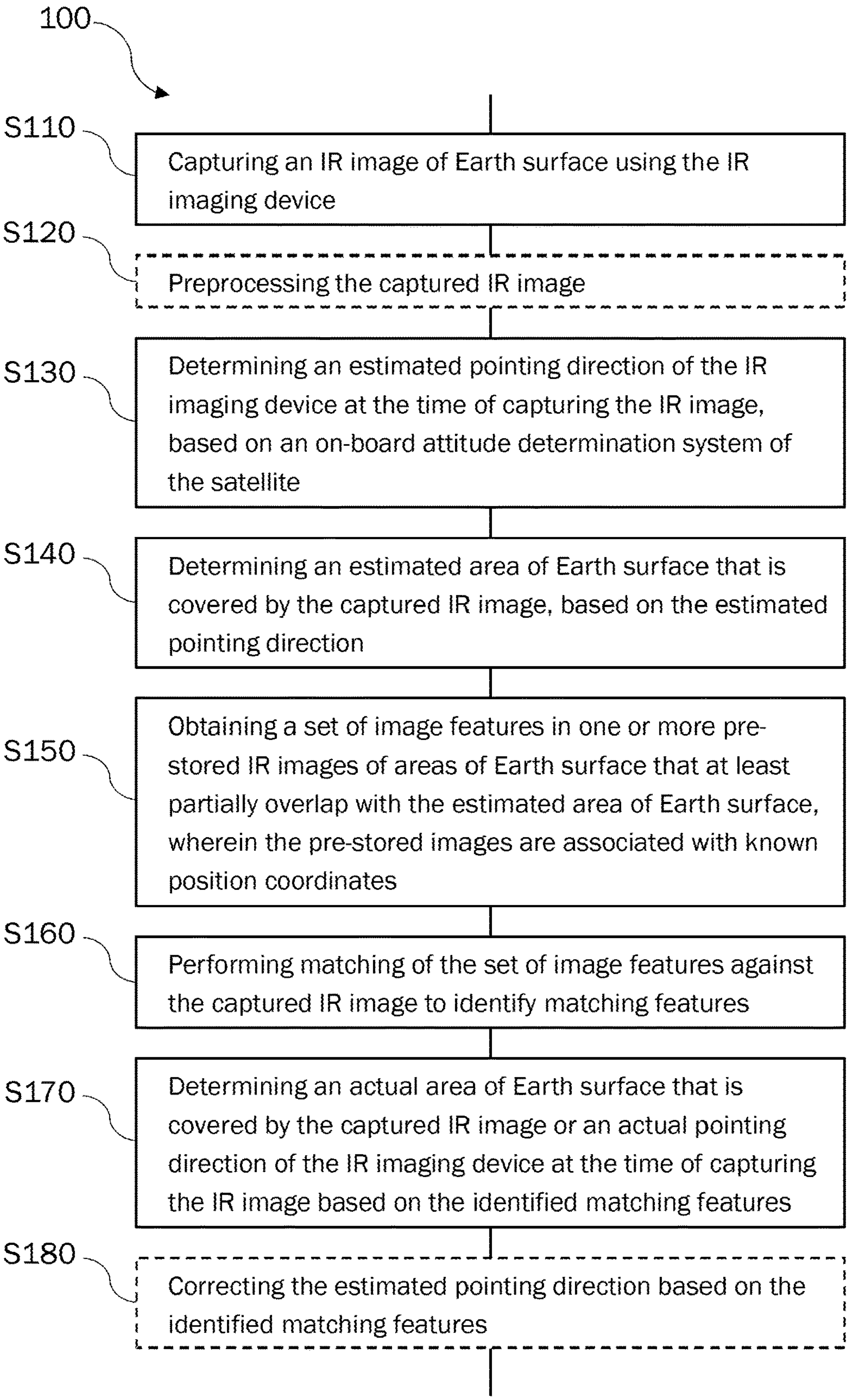
FIG. 1 is a flowchart illustrating an example of a method of satellite-based georeferencing according to embodiments of the disclosure.

In the following, example embodiments of the disclosure will be described with reference to the appended figures.

Identical elements in the figures may be indicated by identical reference numbers, and repeated description thereof may be omitted.

Broadly speaking, the present disclosure relates to techniques for satellite-based georeferencing that may include the following features: Before launch of the satellite, one or more geographical maps (e.g., in the form of images) including for example one or more of landcover classes, digital elevation models, water masks, etc., is loaded (e.g., stored) to the satellite's on-board memory. The geographical map(s) may be a global map or may be assembled to a global map, for example. Further, the geographical map may be memory-optimized for storage aboard the satellite. In any case, the geographical map may have been processed to include features that are relatively constant over the course of the year's seasons. During operation of the satellite, approximate georeferencing is performed based on position data and/or orientation (e.g., attitude) data of the satellite, as obtained from the satellite's ADCS. In particular for smaller satellites, this georeferencing may be rather coarse, due to inaccuracy of the position data and/or orientation data. Accordingly, a (resource-optimized) image matching method is performed on-board and applied to match an incoming IR image to the geographical map or features derived/extracted therefrom, and to obtain more accurate geographical coordinates for the incoming IR image or parts thereof. Depending on use cases, this may involve extracting different characteristics of the IR image and/or matching of partial images, to be able to ignore local image distortion, changes in landscape features (e.g., frozen rivers, lakes), and/or clouds. For example, image matching may be limited to a partial image of the captured IR image that includes an area of interest, such as a vicinity of a fire or burnt area. Depending on the data (e.g., images, partial images, features) involved, different techniques (e.g., algorithms) may be used in the context of the matching, such as preprocessing/optimization of images, template matching, use of neural networks, such as convolutional neural networks, etc. In some implementations, information from additional sensors of the satellite may be used in this process (e.g., by means of sensor fusion).

Thereby, accuracy of georeferencing can be improved compared to direct georeferencing based on information from only the ADCS. For this, a single data upload to the satellite prior to launch is sufficient, enabling the satellite to perform the improved georeferencing independently and directly on-board, without communication to ground, based only on local data. In case feature changes happen (e.g. after building of a dam, etc.), the data and features of this restricted local region can be updated during the lifetime of the satellite via satellite uplink while keeping the rest of the uploaded data untouched.

An example of a method 100 of satellite-based georeferencing according to embodiments of the disclosure is illustrated in the flowchart of FIG. 1. Specifically, method 100 can perform georeferencing for IR images of Earth surface captured by a satellite-mounted IR imaging device that points towards Earth. Method 100 may be performed aboard a satellite. This satellite may be a CubeSat, for example. Typical orbit heights for a satellite performing method 100 may be between 450 to 550 kilometers.

Method 100 comprises steps S110 through S180, of which at least steps S120 and S180 may be optional. In particular step S120 may be performed at any suitable timing within method 100 and is in this regard not limited to the example shown in FIG. 1. For example, step S120 may be performed at any timing between step S110 and step S160.

At step S110, an IR image of Earth surface is captured using the IR imaging device.

The IR imaging device may be an infrared camera comprising, for example, one or more of a microbolometer or a thermopile arrangement, optionally further comprising one or more optical filters transparent in respective IR wavelength ranges. Here, it is understood that the IR imaging device may be additionally capable of imaging in other frequency bands that are not in IR. Importantly, images captured by the IR imaging device at least have a contribution in IR. Without intended limitation, in some implementations, the IR imaging device may however be limited to capturing images in IR.

Accordingly, the IR image generally may be an image with at least a contribution in IR (i.e., in an IR frequency band). For example, the IR image may have an RGB contribution as well as a contribution in IR. It is understood that techniques according to the present disclosure are applicable to any (IR) images with at least a contribution in IR. Without intended limitation, in some implementations, the IR image may however be limited to contributions in IR.

IR images captured by the IR imaging device may have a side length, on Earth surface, of 10 to 800 kilometers. In some implementations, the captured IR images may have side lengths of 350 to 450 kilometers and 100 to 200 kilometers, respectively.

At step S120, the captured IR image is optionally preprocessed. Importantly, this step would be performed at any position after step S110 and before matching at step S160.

For example, the preprocessing may include applying a cloud mask to the captured IR image. Then, the matching at step S160 described below may be restricted to the unmasked portion of the captured IR image. As another example, local distortion or other imperfections of the captured IR image may be masked at this step.

Further, the preprocessing may comprise generic preprocessing (such as applying a cloud mask, for example) and/or type-specific preprocessing, which is described in more detail below. For example, as will be explained in more detail below, image features that are used for the matching in step S160 may be of different types and the type-specific preprocessing may be specifically adapted to the image feature types.

At step S130, an estimated pointing direction of the IR imaging device at the time of capturing the IR image is determined based on an on-board attitude determination system of the satellite.

Although not shown in FIG. 1, method 100 may further relate to or involve determining an estimated location of the IR imaging device (e.g., relative to Earth), together with the estimated pointing direction. The determination may be further based, in either case, on an on-board GNSS sensor/receiver (e.g., GPS sensor/receiver) of the satellite.

At step S140, an estimated area of Earth surface that is covered by the captured IR image is determined based on the estimated pointing direction. This may be done for example by referring to the satellite's position and estimated pointing direction, and determining a location on earth to which the IR imaging device had pointed at the time of capturing the IR image. The estimated area on Earth surface can then be determined to correspond to a vicinity (e.g., with predetermined shape and/or size) around the determined location.

At step S150, a set of image features (e.g., templates) in one or more pre-stored images of areas of Earth surface that at least partially overlap with the estimated area of Earth surface is obtained. Without intended limitation, these pre-stored images may relate to IR images, binary water masks, digital elevation models, landcover classes, etc. Further, the pre-stored images are understood to be associated with known position coordinates. The image features may be said to relate to IR image features. For example, the image features may relate to any (surface) characteristics with an imprint in IR, or generally, to any features that are discernible in IR. In most general terms, the image features might be said to relate to anything that has a temperature or temperature profile that can be reliably distinguished from its surroundings.

It is understood that the estimated area of Earth surface may extend beyond an actual size (e.g., footprint) of the captured IR image by a predetermined margin, to ensure that despite the uncertainty of the estimated area (due to the uncertainty of the estimated pointing direction), any and all image features that are potentially relevant for the captured IR image are included in the set of image features. The predetermined margin may be based on or correspond to a quantity derived from the uncertainty of the pointing direction and/or the typical size of the image features.

In some implementations, the set of image features may be obtained (e.g., read, retrieved) from a database of features maintained aboard the satellite.

Alternatively, the set of image features may be determined (e.g., derived, extracted) based on the prestored images, for example in (parts of) prestored images, landcover classes, etc., that at least partially overlap with the estimated area.

Hybrid models are feasible as well. In any case, each image feature may be associated with known position coordinates. The position coordinates of an image feature may be derived for example from known coordinates associated with a corresponding prestored IR image from which the image feature is obtained (e.g., derived or extracted), or to which it otherwise relates.

If the image features are obtained from a database, they may be pre-stored as image or vector files in a storage medium aboard the satellite, for example.

The aforementioned image features in the set of image features may have a side length, on Earth surface, of 0.5 to 10 kilometers. In one example, the image features may have a size of about 5 km×5 km. In any case, it is understood that the image features are smaller (e.g., substantially smaller) than the captured IR image.

Further, the aforementioned image features may relate to one or more of coast lines, water bodies (e.g., lakes, rivers), ridges of natural elevation (e.g., mountain ridges), underground rivers or currents, landcover characteristics, and any surface characteristics with an imprint in IR.

Importantly, any of the aforementioned feature categories may have an imprint in IR, or put differently, they may be discerned in IR. For example, mountain ridges typically have one warmer side and one colder side, making them stand out in IR imagery. As another example, water bodies, such as rivers and lakes, typically have a different temperature than surrounding dry area (e.g., riverbanks, lake shores). The same applies to coastlines, where the ocean typically has a different temperature than on-shore areas, and to underwater currents (at least in shallow waters), that also tend to have different temperature than surrounding water. As yet another example, underground rivers tend to allow for lusher vegetation above the underground rivers, which will then lead to a discernible imprint in IR.

Further, any of the aforementioned feature categories may have an imprint in IR regardless of time of day, weather condition, and/or time of the year, allowing for continuous and uninterrupted application of techniques according to the present disclosure.

The different categories of image features mentioned above may be said to define different types of image features. Accordingly, the set of image features may in some implementations comprise a plurality of types of image features.

As described above, different preprocessing may be applied at step S120 to yield differently preprocessed IR images. For example, there may be, possibly in addition to generic preprocessing (e.g., masking, cloud masking), specific types of preprocessing for each of the different types of image features in the set of image features. Accordingly, there may be one specifically preprocessed IR image for each type of the image features, for example one IR image preprocessed for (matching to) coast lines, one IR image preprocessed for (matching to) ridges of natural elevation, and so forth. The specific type of preprocessing for coast lines may relate to the addition of noise (e.g., white noise), for example.

At step S160, matching of the set of image features against the captured IR image is performed to identify matching features. Here, the matching features are those image features that are found to match or correspond to (portions of) the captured (and optionally preprocessed) IR image.

Performing the matching may relate to applying a matching method or algorithm to the set of image features in relation to the captured IR image. Without intended limitation, the matching or matching method may relate to one of feature matching, template matching, or image registration, for example. For example, correlation algorithms may be used for this purpose, or algorithms based on neural networks, such as convolutional neural networks.

If there is type-specific preprocessing of the captured IR image, it may be of interest to try matching image features of different types to differently preprocessed IR images. In other words, certain preprocessing may be associated with a corresponding certain type of image features as described above, and matching may be performed so that image features of the certain type of image features may be matched against the captured IR image after preprocessing of the certain type. For example, image features of type "A" (e.g., coast lines) may be matched against the captured IR image after preprocessing of type "A" (e.g., preprocessing for coast lines), image features of type "B" (e.g., ridges of natural elevation) may be matched against the captured image after preprocessing of type "B" (preprocessing for ridges of natural elevation), and so forth. Thereby, identifying corresponding structures in the image features and the IR images may be facilitated, improving overall quality and efficiency of the matching.

Any algorithm may be equipped with an uncertainty metric which allows to filter for matches with high likelihood and reduce false positives, for example if no or an inexact cloud mask leads to accidental matches with, e.g., cloud features, or if the presence of ice and/or snow would distort matching results, at least for some feature categories. Likewise, in some implementations the uncertainty metric may take into account uncertainties resulting from image features in certain categories changing over time, such as in accordance with seasonal changes or, especially for the water body feature category, droughts.

At step S170, an actual area of Earth surface that is covered by the captured JR image or an actual pointing direction of the IR imaging device at the time of capturing the IR image is determined based on the identified matching features. This may be done for example based on known position coordinates of the identified matching features.

Additional filter steps with methods such as, for example, clustering or RANSAC may optionally filter out matching features that accidentally fulfil the matching criteria.

At step S180, the estimated pointing direction is optionally corrected based on the identified matching features.

The corrected pointing direction may be used as estimated pointing direction for IR images captured in the future. Additionally or alternatively, the corrected pointing direction may be used for calibration of the on-board attitude determination system. The method may further include correcting the estimated location based on the identified matching features.

Apparatus, Programs, and Recording Media

While methods have been described above, it is understood that the present disclosure likewise relates to apparatus (e.g., computer apparatus or apparatus having processing capability in general) for implementing these methods (or techniques in general).

Figure 2:
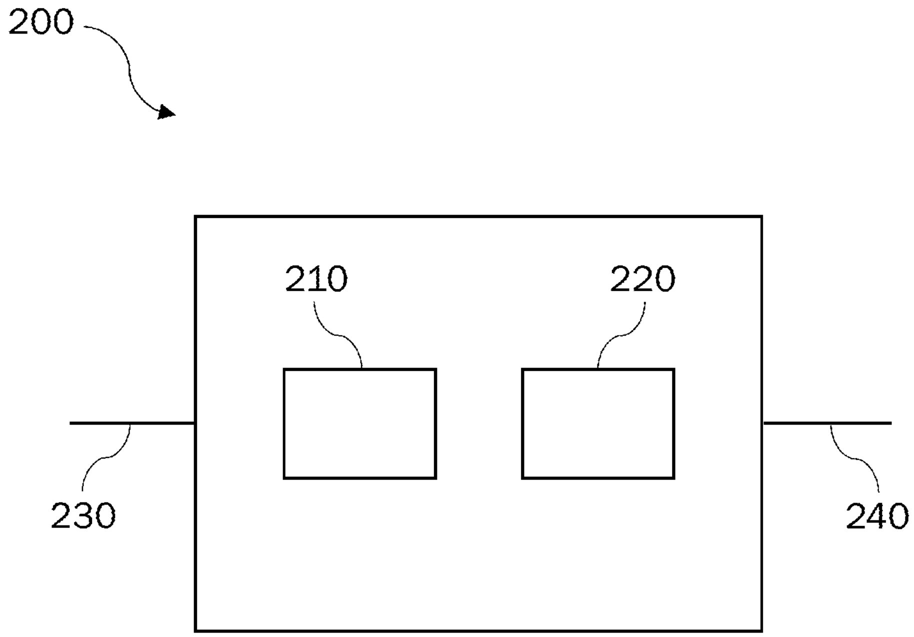
FIG. 2 schematically illustrates an apparatus for implementing methods according to embodiments of the disclosure.

An example of such apparatus 200 is schematically illustrated in FIG. 2. The apparatus 200 comprises a processor 210 (such as a Central processing Unit (CPU), Graphics Processing Unit (GPU), Field Programmable Gate Array (FPGA), for example) and a memory 220 coupled to the processor 210. The memory 220 may store instructions for execution by the processor 210. The processor 210 may be adapted to implement apparatus described throughout the disclosure and/or to perform methods (e.g., methods of satellite-based georeferencing) described throughout the disclosure. The apparatus 200 may receive inputs (e.g., captured IR images, input from an ADCS, GNSS unit, prestored images, and/or image features, etc.) and generate outputs (e.g., an actual area of Earth surface and/or actual pointing direction, etc.) as described throughout the disclosure. To this end, the apparatus may be coupled (e.g., connected to respective units mentioned throughout the disclosure, such as the IR image capturing device, ADCS, storage media/databases, etc.

It is understood that such apparatus may be provided aboard a satellite, in particular a small satellite, such as a CubeSat, for example. In this sense, the present disclosure further relates to such satellite.

The present disclosure further relates to programs (e.g., computer programs) comprising instructions that, when executed by a processor (e.g., processor 210), cause the processor to carry out any of the methods described throughout the disclosure, and to computer-readable storage media storing such programs.

Technical Advantages

The present disclosure allows for direct and real-time determination of accurate position coordinates of images captured aboard satellites. There is accordingly no need for transfer of any data (e.g., IR image data) from the satellites to ground for purposes of georeferencing, which allows avoiding delays from data transmission, additionally noting that data transfer may not be possible at all times depending on the satellites' position in orbit and/or availability of a data connections with sufficient bandwidth. Real-time georeferencing aboard the satellite allows for derivation of meaningful information from satellite imagery, such as locations of fires and/or burnt areas in real time, which then may be advantageously downlinked in a bandwidth-saving format or used for further processing aboard the satellites.

Moreover, since they rely on IR image features, techniques according to the present disclosure are applicable both during daytime and during nighttime, and are not, or only to certain degree, affected by changes due to different weather conditions and/or seasons. For the same reason, these techniques are globally applicable and therefore can be continuously applied regardless of orbit position of the satellites.

Real-time availability of position coordinates associated with IR images captured by the on-board IR imaging device moreover allow for quick and efficient calibration of on-board sensors of the satellites, including its ADCS.

Interpretation

It should be noted that the description and drawings merely illustrate the principles of the proposed method. Those skilled in the art will be able to implement various arrangements that, although not explicitly described or shown herein, embody the principles of the disclosure and are included within its spirit and scope. Furthermore, all examples and embodiment outlined in the present disclosure are principally intended expressly to be only for explanatory purposes to help the reader in understanding the principles of the proposed method and device. Furthermore, all statements herein providing principles, aspects, and embodiments of the disclosure, as well as specific examples thereof, are intended to encompass equivalents thereof.

Enumerated Example Embodiments

Aspects and implementations of the present disclosure may also be appreciated from the following enumerated example embodiments (EEEs), which are not claims.

EEE1. A method of satellite-based georeferencing for IR images of Earth surface captured by a satellite-mounted IR imaging device pointing towards Earth, the method comprising:

- capturing an IR image of Earth surface using the IR imaging device;
- determining an estimated pointing direction of the IR imaging device at the time of capturing the IR image, based on an on-board attitude determination system of the satellite;
- determining an estimated area of Earth surface that is covered by the captured IR image, based on the estimated pointing direction;
- obtaining a set of image features in one or more pre-stored images of areas of Earth surface that at least partially overlap with the estimated area of Earth surface, wherein the pre-stored images are associated with known position coordinates;
- performing matching of the set of image features against the captured IR image to identify matching features; and
- determining an actual area of Earth surface that is covered by the captured IR image or an actual pointing direction of the IR imaging device at the time of capturing the IR image based on the identified matching features.

EEE2. The method according to EEE1, wherein the set of image features are obtained from a database of features maintained aboard the satellite.

EEE3. The method according to EEE1 or EEE2, wherein the image features in the set of image features are pre-stored as image or vector files in a storage medium aboard the satellite.

EEE4. The method according to any one of EEE1 to EEE3, wherein the pre-stored images are prestored in a storage medium aboard the satellite.

EEE5. The method according to any one of EEE1 to EEE4, further comprising: preprocessing the captured IR image before matching.

EEE6. The method according to any one of EEE1 to EEE5, wherein the set of image features comprises a plurality of types of image features;

wherein different preprocessing is applied to the captured IR image, depending on the types of image features, yielding different preprocessed versions of the captured IR image; and wherein the matching is performed for each type of image features and involves matching image features of a given type against a correspondingly preprocessed version of the captured image.

EEE7. The method according to any one of EEE1 to EEE6, wherein the image features in the set of image features relate to one or more of: coast lines; water bodies; ridges of natural elevation; underground rivers or currents; water stream characteristics over oceans; landcover characteristics; and surface characteristics with an imprint in IR.

EEE8. The method according to any one of EEE1 to EEE7, wherein the satellite is a CubeSat.

EEE9. The method according to any one of EEE1 to EEE8, wherein the image features in the set of image features have a side length, on Earth surface, of 0.5 to 10 kilometers.

EEE10. The method according to any one of EEE1 to EEE9, wherein the captured IR image has a side length, on Earth surface, of 10 to 800 kilometers.

EEE11. The method according to any one of EEE1 to EEE10, further comprising: correcting the estimated pointing direction based on the identified matching features.

EEE12. An apparatus comprising a processor and a memory that is coupled to the processor and stores instructions for execution by the processor, wherein the processor is adapted to perform the method according to any one of EEE1 to EEE11.

EEE13. A satellite comprising the apparatus according to EEE12.

EEE14. A program stored in a computer memory including instructions that, when the program is carried out by a computing device, cause the computing device to perform the method according to any one of EEE1 to EEE11.

EEE15. A non-transitory computer-readable storage medium storing the program according to EEE14.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of satellite-based georeferencing for IR images of Earth surface captured by a satellite-mounted IR imaging device pointing towards Earth, the method comprising:

capturing an IR image of Earth surface using the IR imaging device;

determining an estimated pointing direction of the IR imaging device at the time of capturing the IR image, based on an on-board attitude determination system of the satellite;

determining an estimated area of Earth surface that is covered by the captured IR image, based on the estimated pointing direction;

obtaining a set of image features in one or more pre-stored images of areas of Earth surface that at least partially overlap with the estimated area of Earth surface, wherein the pre-stored images are associated with known position coordinates;

performing matching of the set of image features against the captured IR image to identify matching features; and determining an actual area of Earth surface that is covered by the captured IR image or an actual pointing direction of the IR imaging device at the time of capturing the IR image based on the identified matching features.

2. The method according to claim 1, wherein the set of image features are obtained from a database of features maintained aboard the satellite.

3. The method according to claim 1, wherein the image features in the set of image features are pre-stored as image or vector files in a storage medium aboard the satellite.

4. The method according to claim 1, wherein the pre-stored images are pre-stored in a storage medium aboard the satellite.

5. The method according to claim 1, further comprising: preprocessing the captured IR image before template matching.

6. The method according to claim 1, wherein the set of image features comprises a plurality of types of image features;

wherein different preprocessing is applied to the captured IR image, depending on the types of image features, yielding different preprocessed versions of the captured IR image; and wherein the matching is performed for each type of image features and involves matching image features of a given type against a correspondingly preprocessed version of the captured image.

7. The method according to claim 1, wherein the image features in the set of image features relate to one or more of:

coast lines;

water bodies;

ridges of natural elevation;

underground rivers or currents;

water stream characteristics over oceans;

landcover characteristics; or surface characteristics with an imprint in IR.

8. The method according to claim 1, wherein the satellite is a CubeSat.

9. The method according to claim 1, wherein the image features in the set of image features have a side length, on Earth surface, of 0.5 to 10 kilometers.

10. The method according to claim 1, wherein the captured IR image has a side length, on Earth surface, of 10 to 800 kilometers.

11. The method according to claim 1, further comprising: correcting the estimated pointing direction based on the identified matching features.

12. An apparatus comprising a processor and a memory that is coupled to the processor and stores instructions for execution by the processor, wherein the processor is adapted to perform the method according to claim 1.

13. A satellite comprising the apparatus according to claim 12.

14. A non-transitory computer memory including computer-executable instructions stored thereon that, when executed by a computing device, cause the computing device to perform the method according to claim 1.

15. A non-transitory computer-readable storage medium storing instructions that, in response to execution by a computing device, cause the computing device to perform the method according to claim 1.

16. The non-transitory computer-readable storage medium according to claim 15, wherein the set of image features are obtained from a database of features maintained aboard the satellite.

17. The non-transitory computer-readable storage medium according to claim 15, wherein the image features in the set of image features are pre-stored as image or vector files in a storage medium aboard the satellite.

18. The non-transitory computer-readable storage medium according to claim 15, wherein the pre-stored images are pre-stored in a storage medium aboard the satellite.

19. The non-transitory computer-readable storage medium according to claim 15, wherein the set of image features comprises a plurality of types of image features;

wherein different preprocessing is applied to the captured IR image, depending on the types of image features, yielding different preprocessed versions of the captured IR image; and wherein the matching is performed for each type of image features and involves matching image features of a given type against a correspondingly preprocessed version of the captured image.

20. The non-transitory computer-readable storage medium according to claim 15, wherein the instructions cause the computing device to correct the estimated pointing direction based on the identified matching features.

* * * * *